(No Model.) 3 Sheets—Sheet 3.
R. U. ETZENSBERGER.
Apparatus for Making Infusions or Extracts.
No. 236,792. Patented Jan. 18, 1881.
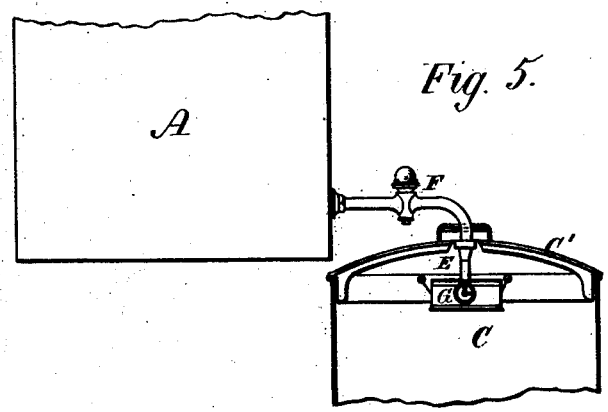
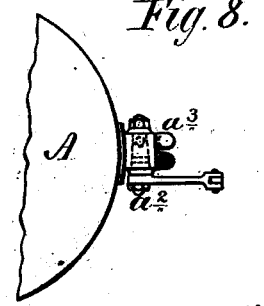
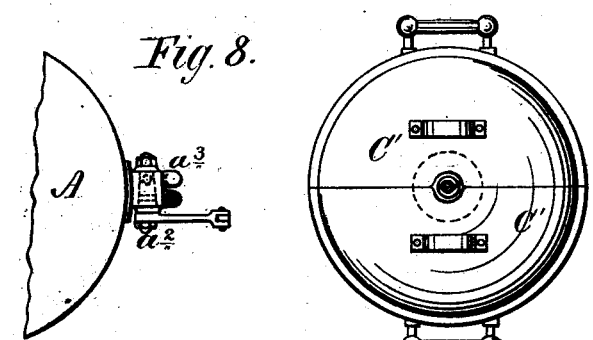
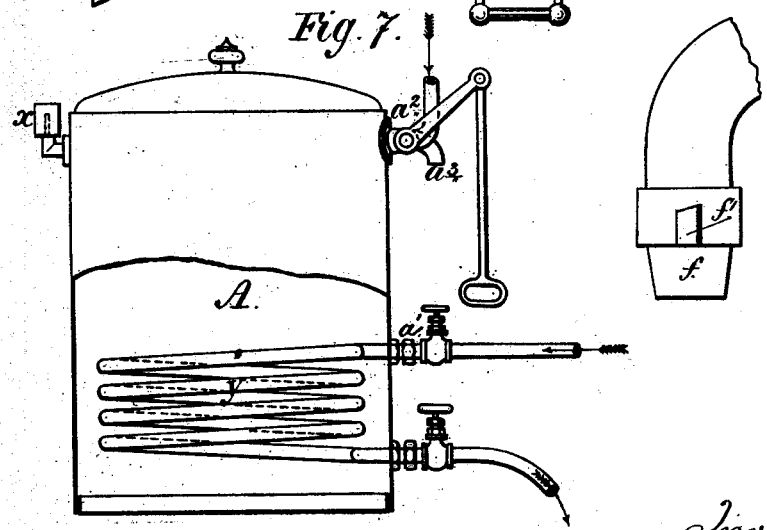
Witnesses
J. Saib
Harold Serrell
Inventor
Robert U. Etzenberger
Lemuel W. Serrell

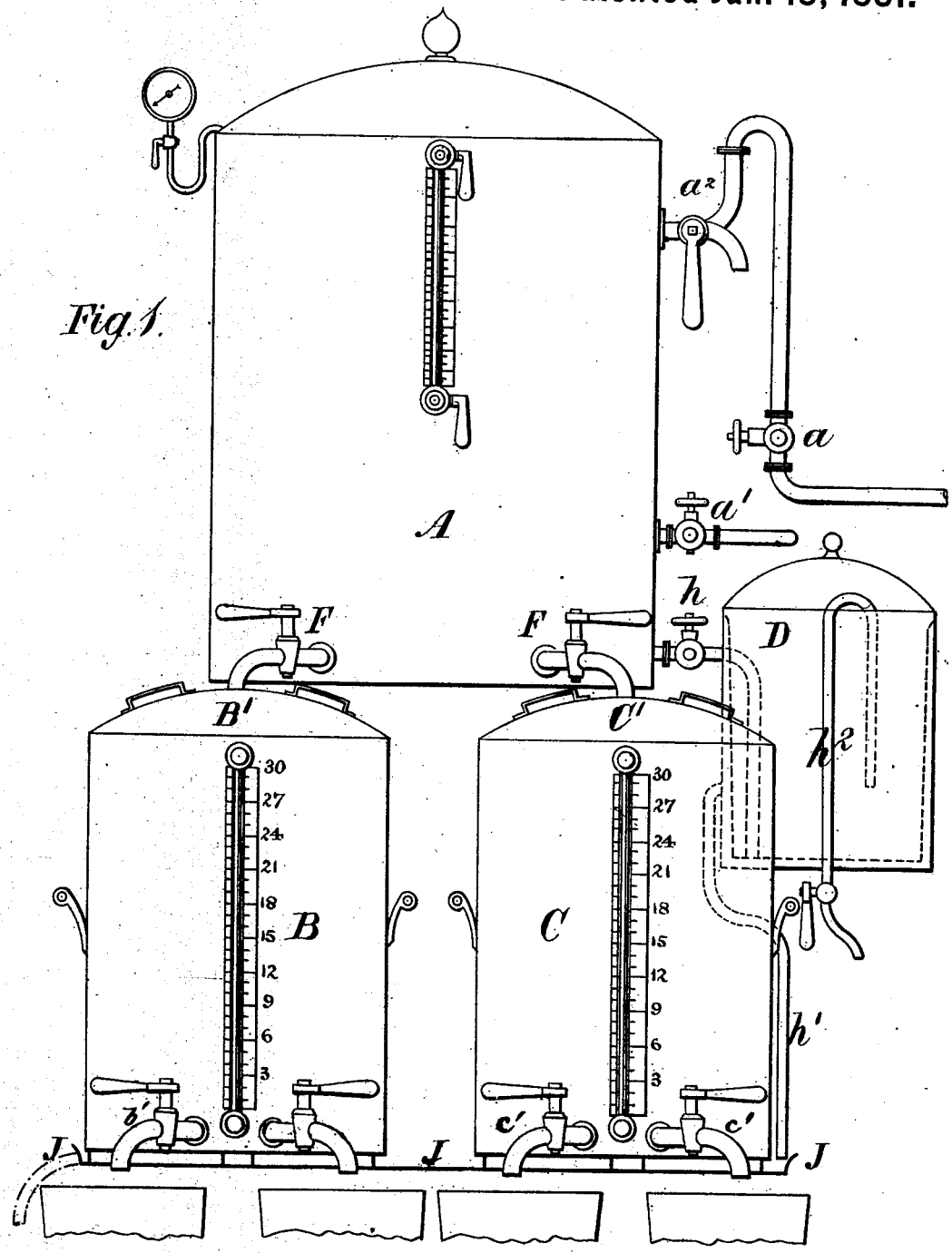

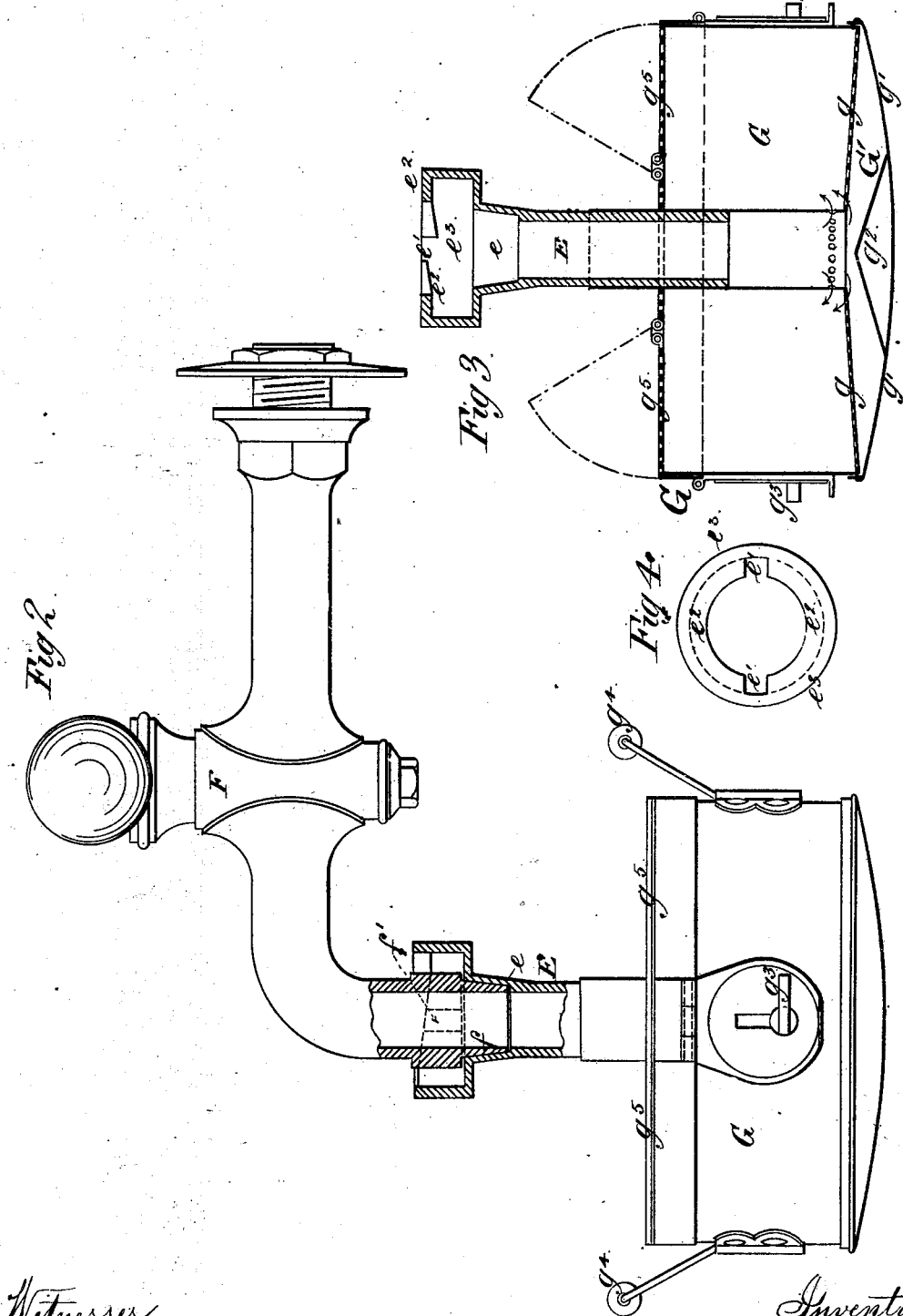

UNITED STATES PATENT OFFICE.

ROBERT U. ETZENSBERGER, OF ST. PANCRAS, COUNTY OF MIDDLESEX, ENGLAND.

APPARATUS FOR MAKING INFUSIONS OR EXTRACTS.

SPECIFICATION forming part of Letters Patent No. 236,792, dated January 18, 1881.

Application filed September 6, 1880. (No model.) Patented in England July 17, 1880.

*To all whom it may concern:*

Be it known that I, ROBERT ULRICH ETZENSBERGER, of St. Pancras, in the county of Middlesex, England, have invented new and useful Improvements in Apparatus for Making Infusions or Extracts from Substances, (for which I have obtained provisional protection in Great Britain, No. 2,959, bearing date the 17th day of July, 1880,) of which the following is a specification.

My invention particularly refers to the construction and arrangement of apparatus, on a large scale, for making infusions or extracts of tea and coffee in large quantities, for use in public places of amusement, hospitals, barracks, asylums, factories, and otherwise, as may be required. For this purpose I provide a circular or square boiler of any convenient size—say one capable of holding a hundred gallons, or more, of water—which is filled, or nearly so, with water, to be heated by means of a steam-coil placed inside at or near the bottom of the boiler. The boiler is provided with pressure and water gages, filling-up and air cock and draw-off cocks. Below and in front of or around the boiler I place the vessels or infusers for the reception of the infusions required—say two or more—for the manufacture of coffee and tea or other infusions. The tea-leaves, the ground coffee, or other substances, are placed in boxes perforated at the upper and lower part, and constructed as described hereinafter. These boxes, when filled, are fitted to the draw-off cocks of the boiler, and so placed that they terminate in the center of the vessels for the reception of the infusion. The nozzles of these cocks enter the boxes containing the tea and coffee, forming with them a water-tight joint, so that by turning the tap of either cock boiling water is poured into the boxes, and passing upward through the said boxes tea or coffee, as the case may be, overflows from the top of the boxes and falls into the vessel or receiver below as an infusion of tea or coffee, as the case may be, or any other infusion, according to the material placed in the perforated boxes. Gage-glasses are provided to these receivers, which indicate the quantity of liquid made, and cocks at the lower end for drawing off the contents—that is, the infusions.

The cocks leading from the boiler have their nozzles made to fit into corresponding sockets formed in the tubes leading to the interior of boxes for holding the substances from which the infusions are to be made, and the construction of these boxes will be presently described. The nozzles of the cocks are secured in the sockets by part flanges or lugs passing through apertures, and turning said flanges when they are inserted, or by any convenient means of fastening, so that a water-tight joint may be readily obtained. The tube through center of holder leads through the lower perforation to a false bottom of the holder. The inner surface of this space is provided in the center with a conical boss or elevation, against which the water passing down the tube impinges, and is thence projected up and sideward against and through the perforations in the box above containing the tea, coffee, or other substance from which the infusions or extracts are to be made. These boxes are provided with firmly-secured perforated covers or doors, preferably two, one on each side of the water-filling tube. Convenient handles are placed at the top, with wood pieces attached, to facilitate the removal and introduction of the boxes from the top of the infusers, which latter are covered with lids, put on preferably in two parts, for the sake of convenience in passing same round the water-taps and over the boxes before described.

At the side of the boiler, and, preferably, near the upper level of the infusers, I place a vessel for heating milk. This vessel is surrounded by another vessel, forming a steam-jacket, which receives the exhaust-steam from the coil in the boiler. This exhaust-steam fills the jacket with condensed water, heats the milk in the inner vessel to the required temperature, and an overflow-pipe leading from the jacket into a tray conveys the condensed water used for heating the milk to the said tray in which the receivers are placed, and which is also provided with an overflow-pipe, so that there may be kept up, if desired, a continuous flow of hot water for heating the milk, and for preserving the heat of the infusions in the vessels without any expense or trouble.

The milk is drawn from the top of the inner vessel by a siphon-pipe with tap below. The inner vessel or milk-holder is removable for cleaning purposes.

Handles are provided to all vessels for removing same from place to place and for putting them conveniently into position.

Apparatus constructed in the manner before described may be supplied with water obtained from any suitable or convenient boiler or vessel which may supply any desired number of vessels, suitable cocks being provided to direct the boiling water to the particular vessel in which the infusion is to be made.

In order that this my invention may be more fully understood, I will describe the same with reference to the accompanying drawings, of which—

Figure 1 is a front elevation, showing a boiler combined with an infusing-vessel, say for tea, another infusing-vessel, say for coffee, and a heating-vessel, say for milk. Fig. 2 is a part sectional elevation of a tap forming the outlet from the boiler, as applied to and combined with a box for holding the coffee or other substance to be infused. Fig. 3 is a vertical section through the said box, and Fig. 4 a plan of the upper or pipe part of same. Fig. 5 is an elevation of part of the boiler A, and partial section of one of the infusers C, with infusing-box G. Fig. 6 is a plan of the infusers C, showing the division of the lid or half-covers C'. Fig. 7 is a partial section and elevation of the boiler A with the safety-valve $x$, with the steam-inlet cock $a'$ to the steam-coil $y$, and with the cock $a^2$ for supplying the boiler with water, the plug of this cock being formed also with a passage, which corresponds with a shank, $a^3$, to the air. Fig. 8 is a partial plan of the same, and Fig. 9 is an elevation of the end of the faucet, showing the lugs $f'$.

A is the boiler, which may be made large enough to hold one hundred gallons, or more, of water, which is to be supplied to the boiler by the pipe $a$ and cock $a^2$, and the water in said boiler is heated by steam supplied through the pipe and cock $a'$ to the steam-coil $y$ in the lower part of the boiler, or it may be heated by free steam. Said boiler is fitted with a pressure-gage and water-gage, as shown in Fig. 1.

B is an infusing-vessel, say for coffee, and C a similar one, for tea, both of which are fitted with gage-glasses, as shown, and D is a milk-heater.

F F are cocks for drawing the heated water off from the boiler A and conveying it into the boxes for holding the tea or coffee to be infused, and which are placed centrally inside the vessels B and C. The mode of connection of these boxes with the draw-off cocks F will be understood from Figs. 2, 3, and 4. The cock F, Fig. 2, terminates below in a cone-nozzle, $f$, ground so as to fit water-tight in a corresponding socket part, $e$, of a pipe, E, which is fixed to the top of the infusion-box G. The nozzle $f$ of the cock F is secured to the socket $e$ by part flanges or lugs $f'$, which are passed through the apertures $e'$, Fig. 4, formed in an inner projecting flange, $e^2$, of the chamber $e^3$ on the top of the socket $e$. The box G is then taken hold of and turned partly round, so that the flange-lugs $f'$ come under the flange $e^2$, which is formed slanting, as shown in Figs. 2 and 3, for the purpose of giving a gradually-increased pressure, tending to press the nozzle $f$ and the socket $e$ tight together. Instead of such a bayonet-joint, a screw-and-nut joint with part of the thread cut away may be used, or any other quickly and conveniently made water-tight joint. The descent-tube E is continued down centrally through the infusion-box G, which is formed with a perforated diaphragm, $g$. The space G' between the latter and the bottom $g'$ is contracted in the middle, as shown, by a conical boss, $g^2$, or elevation of the bottom $g'$. By this means I cause the hot water to pass evenly up through all parts of the box. $g^5$ $g^5$ are hinged perforated covers—in this case two in number, and secured to the sides of the box by strong buttons $g^3$. There is a handle, $g^4$, on each side, for conveniently removing the boxes and for introducing them into the infusing-vessels B and C. The latter have lids B' and C', by preference in two parts, as shown, for conveniently fixing them at each side of the cock F and over the boxes G.

The tea-leaves, ground coffee, or other substance to be infused, having been put in the box G, and the lids $g^5$ having been closed and secured, the box G is connected to the cock F, and, by part of a turn, firmly and water-tight secured thereto. The lid B' or C' is then put on. The cock F may then be turned, admitting boiling hot water to the pipe E, and by the perforations therein and in the diaphragm $g$ it will rise up through the material in the box, and, passing out through the perforated covers $g^5$, fall into the receiver B or C as an infusion, ready to be drawn off into pails or other receptacles by means of the cocks $b'$ or $c'$.

To make concentrated extracts steam may be used instead of boiling water.

D is a vessel for heating milk, and placed, preferably, near the upper level of the infusers B and C. It is fitted with a steam-jacket all round and below, as shown in dotted lines. This jacket receives the exhaust-steam from the steam-coil in the boiler A by the cock $h$. The steam condensing in the jacket and heating the milk in the vessel D, as required, overflows as water by the pipe $h'$ to the tray J, in which the infusers B and C are placed, thus keeping them warm. The tray J may have an overflow-pipe, and a continuous flow of condensed water may thus be established, the milk being heated and the tea and coffee kept hot thereby. $h^2$ is a siphon-pipe, with cock for drawing off the hot milk, as required. The interior or milk vessel proper is removable for cleaning.

Having thus described and ascertained the nature of this invention, I declare that I do not lay general claim to boxes or holders for making infusions in which the boiling-hot water is passed up through a perforated bottom in the holder containing the material to be infused; but

I claim—

1. An apparatus for making infusions and for keeping the same hot for use, consisting of a boiler containing hot water, in combination with infusing-boxes G, mounted in receivers B and C, which stand in a tray supplied with warm water from a milk-heater heated by waste heat from the boiler, all substantially as set forth.

2. The box or holder G, having a central descent-tube, E, lower space, G', perforated diaphragm $g$, and perforated lids $g^5$, for the infusion of tea, coffee, and other substances, substantially as described and shown.

3. The steam-heater boiler A, in combination with the infusing-boxes G, in the receivers B and C, which stand in a tray, J, supplied with warm water from the jacket of a milk-heater, D, heated by waste steam from the boiler, all substantially as set forth.

In testimony whereof I have hereunto set my hand.

R. U. ETZENSBERGER.

Witnesses:
 PETER JENSEN,
 R. GUY,
  *Both of 33 Chancery Lane.*